United States Patent
Mitchell et al.

(10) Patent No.: US 9,996,949 B2
(45) Date of Patent: Jun. 12, 2018

(54) SYSTEM AND METHOD OF PRESENTING VIEWS OF A VIRTUAL SPACE

(71) Applicant: DISNEY ENTERPRISES, INC., Burbank, CA (US)

(72) Inventors: Kenneth J. Mitchell, London (GB); Charalampos Koniaris, London (GB); Jose Antonio Iglesias-Guitian, London (GB); Bochang Moon, London (GB); Eric Smolikowski, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 110 days.

(21) Appl. No.: 15/299,724

(22) Filed: Oct. 21, 2016

(65) Prior Publication Data

US 2018/0114343 A1    Apr. 26, 2018

(51) Int. Cl.
*G06T 11/00* (2006.01)
*G06K 9/62* (2006.01)
*G06T 7/40* (2017.01)

(52) U.S. Cl.
CPC .......... *G06T 11/001* (2013.01); *G06K 9/6215* (2013.01); *G06T 7/408* (2013.01); *G06T 2207/10024* (2013.01); *G06T 2207/20076* (2013.01)

(58) Field of Classification Search
None
See application file for complete search history.

(56) References Cited

U.S. PATENT DOCUMENTS

| | | | |
|---|---|---|---|
| 9,870,617 B2 * | 1/2018 | Piekniewski | G06T 7/292 |
| 9,911,242 B2 * | 3/2018 | Sundaresan | G06T 19/20 |
| 2005/0017968 A1 * | 1/2005 | Wurmlin | G06T 15/205 345/419 |
| 2006/0280360 A1 * | 12/2006 | Holub | G01J 3/02 382/162 |
| 2007/0036224 A1 * | 2/2007 | Srinivasan | H04N 19/105 375/240.18 |
| 2016/0358312 A1 * | 12/2016 | Kolb | G06T 5/003 |

* cited by examiner

*Primary Examiner* — Mark Zimmerman
*Assistant Examiner* — Yu-Jang Tswei
(74) *Attorney, Agent, or Firm* — Sheppard Mullin Richter & Hampton LLP

(57) ABSTRACT

Views of a virtual space may be presented based on predicted colors of individual pixels of individual frame images that depict the views of the virtual space. Predictive models may be assigned to individual pixels that predict individual pixel colors of individual pixels at individual time points. Individual models may be updated and/or reprojected to other pixels based on comparisons of the predicted pixel colors and colors specified by in a raster input signal.

20 Claims, 3 Drawing Sheets

SYSTEM AND METHOD OF PRESENTING VIEWS OF A VIRTUAL SPACE

FIELD OF THE DISCLOSURE

This disclosure relates to presenting views of a virtual space.

BACKGROUND

Computer generated animations and/or video games may be generated from three-dimensional models of virtual spaces. The virtual space may be used to tell a story using one or more virtual objects that may be placed within the virtual space. The virtual objects may represent characters, topographical elements, and/or other objects within the virtual space. Virtual objects may be animated in accordance with a storyline, plot, action sequence, character dialogue, and/or other video content of the animated video. To generate an animation, two-dimensional images may be generated from the three-dimensional model at various points in time. The images may be compiled together to comprise frames of the video.

High quality real-time presentation of three-dimensional content generated with rasterization pipelines may exhibit temporal and spatial coherence. A classic problem in computer graphics is that rasterization pipelines may recompute each frame image from scratch, incurring a lot of repeated processing involving heavy geometry processing and/or shading stages. Although graphics cards continue to evolve their computational power, the increasing demand of more complex and sophisticated shading computations create a compromise between available computational resources and achievable spatial and temporal resolution. As a consequence, spatial and temporal resolution are often the first candidates to bow to the performance constraints.

The two main sources of aliasing in rasterization are spatial (e.g. visibility and shading) and temporal (e.g. flickering and specular aliasing). Supersampling is an adopted solution based on computing higher resolution images and downsampling them to obtain the final filtered result. In rasterization, supersampling usually refers to the spatial and temporal dimensions. On the spatial side, multisampling may be combined with decoupled shading architectures that separate visibility samples from shading in order to minimize rendering costs. Temporal coherence may be exploited by reusing samples across multiple frames, resulting in reduced rendering costs. Amortizing samples across time does not only allow to incorporate computationally more intensive shading effects, but also offers opportunities for extending high-end graphics applications to lower-spec consumer-level hardware. In order to avoid excessive memory requirements, the idea of using exponential history buffers has been explored, even with subpixel accuracy. However, it is still an open research topic how to infer future shading values from pixel history or whether to invalidate history due to occlusion and disocclusion events. These problems become even more challenging when only a few number of samples per pixel (spp) are available (e.g. 1 spp per-frame).

SUMMARY

One aspect of the disclosure relates to a system configured for presenting views of a virtual space. The system may be configured to facilitate presenting of views of the virtual space by assigning predictive models to individual pixels of frame images that depict views of the virtual space over time. Individual predictive models may be configured to predict pixel colors of individual pixels for individual frame images associated with individual time points. Through iterations performed over the individual time points associated with individual frame images, predicted colors of individual pixels may be compared to input pixel information. The input pixel information (e.g., a raster input signal) may specify pixel colors of individual pixels as derived from state of the virtual space. If a predicted pixel color of a given pixel may be determined to more closely represent a specified pixel color, then the given pixel may be assigned the predicted pixel color and the assigned predictive model of the given pixel may be maintained. If a predicted pixel color of a neighboring pixel more closely represents a specified pixel color of a given pixel, than the given pixel may be assigned the pixel color of the neighboring pixel, and a model instance of a predictive model assigned to the neighboring pixel may be reprojected to the given pixel. For individual frame images, once pixels are assigned a pixel color, further color blending techniques may be applied to determine presented pixel colors of the individual pixels used for generating presented frame images.

In some implementations, the system may include one or more of one or more physical processors configured by machine-readable instructions, non-transitory electronic storage, and/or other components. The non-transitory electronic storage may be configured to store and/or obtain state information and/or other information. State information may define state of a virtual space over time. State information may comprise one or more of spatial information, temporal information, and/or other information. Spatial information may describe one or more of a computer-generated model of a virtual space; virtual objects present in the virtual space; position, location, orientation, and/or other attributes of virtual objects over time; a viewpoint within the model; and/or other information. Temporal information may include a timeline and/or other information. A timeline may include one or more time points along the timeline. Time points along a timeline may correspond to the spatial information.

Executing the machine-readable instructions may cause the one or more physical processors to facilitate presenting views of a virtual space. The machine-readable instructions may include one or more of a space component, a timing component, a prediction component, a frame image component, an update component, and/or other components.

The space component may be configured to implement one or more instances of a virtual space and/or video game taking place in the virtual space executed by machine-readable instructions to determine state of the virtual space.

The timing component may be configured to determine time points associated within individual frame images of a video of the virtual space. Individual frame images may comprise individual pixels having pixel colors, pixel locations, and/or other attributes. Individual frame images may depict individual views of the virtual space at individual ones of the associated time points. By way of non-limiting illustration, the time points may include one or more of a first time point associated with a first frame image, a second time point associated with a second frame image, and/or other time pints associated with other frame images.

The prediction component may be configured to assign and/or reassign predictive models to individual pixels. Individual predictive models may be configured to predict individual pixel colors of individual pixels at individual time points. By way of non-limiting illustration, a first pixel may be being assigned a first model instance of a first predictive model. By way of non-limiting illustration, a second pixel may be assigned a second model instance of a second predictive model. Other pixels may be assigned other instances of predictive models. For individual time points, prediction component may be configured to predict, using assigned individual predictive models, individual pixel colors of the individual pixels. By way of non-limiting illustration, for the first time point the first model instance of the first predictive model may be configured to predict a first color for the first pixel in the first frame image. By way of non-limiting illustration, for the first time point the second model instance of the second predictive model may be configured to predict a second color for the second pixel in the first frame image.

The frame image component may be configured to, for individual time points, obtain, based on state information, input pixel information. Input pixel information may specify colors of individual pixels of individual frame images that may depict a view of the virtual space at the individual time points. By way of non-limiting illustration, for the first time point the input pixel information may specify one or more of a third color for the first pixel in the first frame image, a fourth color for the second pixel in the first frame image, and/or other colors for other pixels in the first frame image.

The frame image component may be configured to, for individual pixels at individual time points, determine differences between individual predicted pixel colors of the individual pixels and the individual specified pixel colors of the individual pixels included in the input pixel information, and differences between individual predicted pixel colors of neighboring pixels and the individual specified pixel colors of the individual pixels included in the input pixel information. In some implementations, determined differences may reflect an estimated error between color predictions and specified colors.

The frame image component may be configured to, for individual pixels at individual time points, responsive to the differences between individual predicted pixel colors of neighboring pixels and the individual specified pixel colors of the individual pixels included in the input pixel information being less than the differences between individual predicted pixel colors of the individual pixels and the individual specified pixel colors of the individual pixels included in the input pixel information, assign the individual pixel colors of the individual pixels in the individual frame images as the individual predicted pixel colors of the individual neighboring pixels.

By way of non-limiting illustration, for the first pixel at the first time point, based determining a first difference between the first color and the third color, and a second difference between the second color and the third color, and responsive to determining the second difference is less than the first difference, the frame image component may be configured to assign the pixel color of the first pixel in the first frame image to the second color. By way of non-limiting illustration, for the second pixel at the first time point, based determining a third difference between the second color and the fourth color, and a fourth difference between the first color and the fourth color, and responsive to determining the third difference is less than the fourth difference, the frame image component may be configured to assign the pixel color of the second pixel in the first frame image to the second color.

The prediction component may be configured to, for individual pixels at individual time points, responsive to the individual pixels being assigned a pixel color of an individual neighboring pixel, reassign the individual pixels to other instances of individual predictive models assigned to the individual neighboring pixels. In some implementations, responsive to the individual pixels being assigned an individual predicted pixel color for those individual pixels, assignment of individual predictive models to the individual pixels may be maintained. By way of non-limiting illustration, for the first pixel at the first time point, responsive to assigning the second color to the first pixel, the prediction component may be configured to reassign the first pixel to a third model instance of the second predictive model. By way of non-limiting illustration, responsive to the second pixel being assigned the second color, the prediction component may be configured to maintain the assignment of the second instance of the second predictive model to the second pixel.

The update component may be configured to update the individual predictive models assigned to the individual pixels based on the individual differences between individual assigned pixel colors and the individual specified pixel colors. By way of non-limiting illustration, for the first pixel, the third model instance of the second predictive model may be updated based on the second difference. By way of non-limiting illustration, for the second pixel, the second model instance of the second predictive model may be updated based on the third difference.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
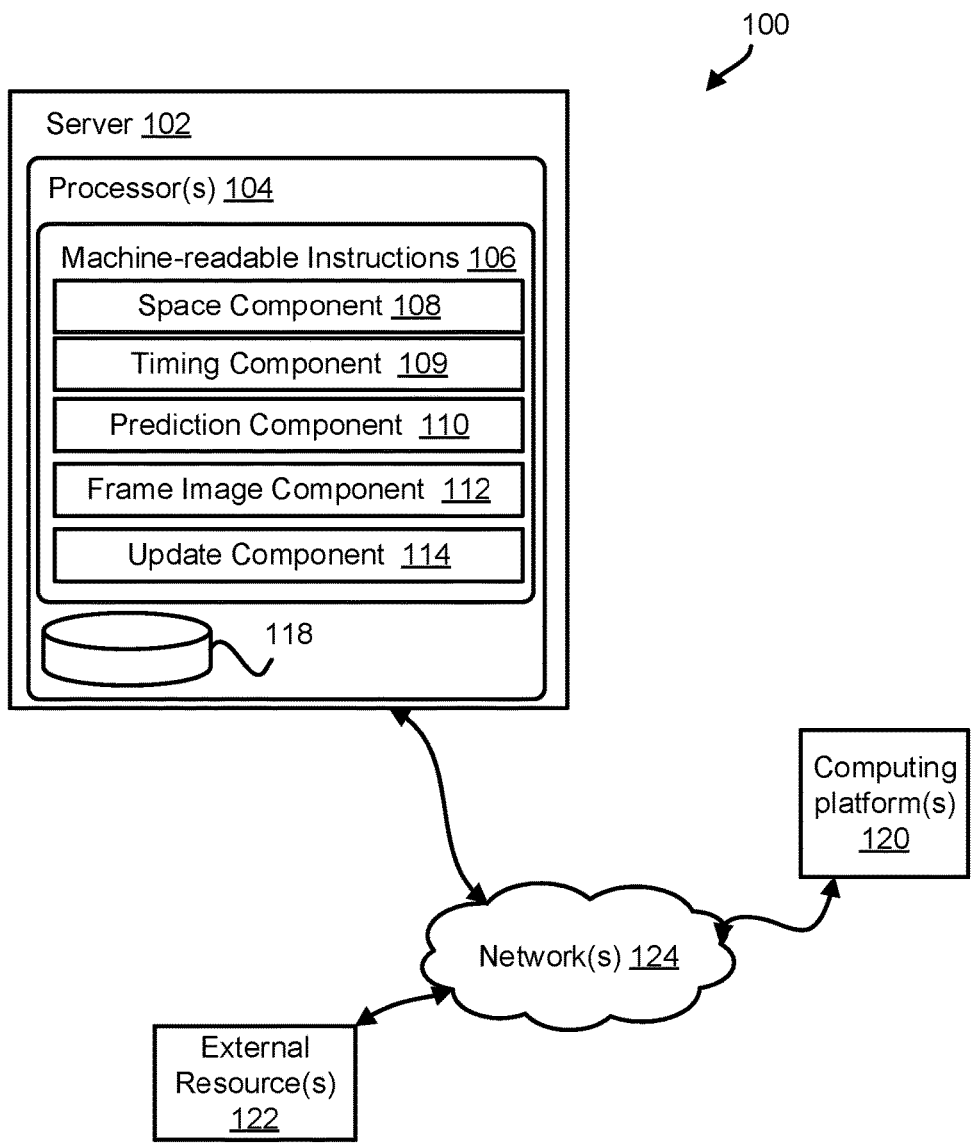
FIG. 1 illustrates a system configured for presenting views of a virtual space, in accordance with one or more implementations.

FIG. 1 illustrates a system 100 configured for presenting views of a virtual space, in accordance with one or more implementations. The system 100 may provide a new approach for tracking a raster input signal and new way of representing pixel history. In some implementations, the system 100 may comprise one or more of a server 102, one or more computing platforms 120, one or more external resources 122, and/or other components. The server 102 may include one or more physical processors 104 configured by machine-readable instructions 106. Executing the machine-readable instructions 106 may cause the one or more physical processors 104 to facilitate presenting views of a virtual space. The machine-readable instructions 106 may include one or more of a space component 108, a timing component 109, a prediction component 110, a frame image component 112, an update component 114, and/or other components.

In some implementations, server 102 may be configured to provide remote hosting of features and/or functions of machine-readable instructions 106 to one or more computing platforms 120 that may be remotely located from server 102. In some implementations, one or more features and/or functions of server 102 may be attributed as local features and/or functions of one or more computing platforms 120. By way of non-limiting example, individual ones of the computing platforms 120 may include one or more physical processors configured machine-readable instructions comprising the same or similar components as machine-readable instructions 106 of server 102. The one or more computing platforms 120 may be configured to locally execute the one or more components that may be the same or similar to the machine-readable instructions 106.

The one or more computing platforms 120 may include one or more of a cellular telephone, a smartphone, a digital camera, a laptop, a tablet computer, a desktop computer, a television set-top box, smart TV, a gaming console, and/or other platforms.

Non-transitory electronic storage 118 may be configured to store and/or obtain state information and/or other information. State information may define state of a virtual space. A virtual space may include virtual space content. Virtual space content may include one or more of topography, virtual objects, and/or other virtual space content. State of the virtual space at individual time points may define one or more of topography, virtual objects, positions of virtual objects, and/or other features of the virtual space and/or virtual space content at individual time points. In some implementations, state information may be known for given time space. By way of non-limiting illustration, state information may comprise information generated by one or more of computer animation techniques, motion capture techniques, and/or other techniques, and stored for use and/or retrieval at a later time. In some implementations, state of a virtual space including a video game taking place in the virtual space may be determined, at least in part, in real-time based on user input (see, e.g., space component 108). By way of non-limiting illustration, state information may comprise information regarding game entities representing users that may be generated in real-time during gameplay by one or more users.

In some implementations, state information may comprise one or more of spatial information, temporal information, and/or other information. Spatial information may describe one or more of a computer-generated model of a virtual space; virtual objects present in the virtual space; position, location, orientation, and/or other attributes of virtual objects over time; a viewpoint within the model; and/or other information.

A model of a virtual space may comprise a simulated space described by its boundaries, topography, simulated physical phenomena (e.g., wind, rain, earthquakes, and/or other phenomena), and/or other content within the virtual space. The topography may be a two-dimensional topography, three-dimensional topography, and/or may be configured in other ways. The topography may include dimensions of the space, and/or surface features of a surface or objects within the virtual space. In some instances, the topography may describe a surface (e.g., a ground surface) that runs through at least a substantial portion of the space.

Virtual objects may comprise one or more of a moving object, a stationary object, user-controlled virtual objects, non-user controlled virtual objects, and/or other objects within the virtual space. Virtual objects may be described by one or more of geometry, size, color, movement, anatomy, transparency, and/or other attributes.

Temporal information may include a timeline and/or other information. A timeline may include one or more time points. A time point may include one or more of a reference start time point (e.g., time "zero" and/or other reference time), a reference ending time point (e.g., a duration from the reference start time and/or other reference time), and/or other time points along the timeline. Time points along a timeline may correspond to spatial information. For example, individual time points along the timeline may correspond to one or more of individual positions and/or orientations of one or more virtual objects and/or topography, a viewpoint within the model of the virtual space, and/or other information conveyed by spatial information.

In some implementations, a video may be generated using state information and/or other information. A given video may have multiple frames, a soundtrack, and/or other components. Individual frames may comprise a two-dimensional frame image. A two-dimensional frame image may be generated from spatial information corresponding to a given time point associated the frame image. By way of non-limiting example, a two-dimensional frame image may be determined from a three-dimensional model of the virtual space by taking a "snapshot" of the model at a given time point along a timeline. Individual frame images may be generated at intervals along a timeline to form multiple frame images of a video. A set of frame images may be compiled together to form a video.

In some implementations, individual frame images may comprise multiple pixels. Individual pixels may be defined by one or more of pixel information, and/or other information. Pixel information may include one or more of pixel color, pixel locations, and/or other information. In some implementations, individual pixel colors may be specified by values of one or more color components, and/or other information. For example, individual colors may be represented within a color space and/or other specifications. A color space may include one or more of an RGB color space, sRGB color space, a CMYK color space, YCgCo color space, and/or other color space representations. A color defined within a color space may be specified by chromaticities of different color components (also referred to as "color channels") of the space, and/or other information. For example, an RGB color space may be defined by three chromaticities of red, green, and blue additive primaries.

By way of non-limiting illustration, a first frame image may include a first pixel and/or other pixels. The first pixel may be defined by a location of the first pixel, a color of the first pixel, and/or other information. A second frame image may also include the first pixel and/or other pixels. The first pixel for the second frame image may be at the same location as for the first frame image.

In some implementations, state information may facilitate determining input pixel information. The input pixel information may specify colors and/or other information of individual pixels of individual frame images that depict a view of the virtual space at the individual time points. For example, a rasterization graphics pipeline may be configured to generate input pixel information from state information and/or other information.

In some implementations, space component 108 may be configured to implement one or more instances of a virtual space and/or video game taking place in the virtual space executed by machine-readable instructions 106 to determine state of the virtual space. Views determined from the state of the virtual space may be communicated (e.g., via streaming, via object/position data, and/or other information) from server 102 to one or more computing platforms 120 for presentation to users. The view determined and presented to the given user may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

In some implementations, the virtual space may include a video game taking place in the virtual space. The view determined and presented to a given user may correspond to a game entity being controlled by the given user. The view determined and presented to the given user may correspond to a location in the virtual space (e.g., the location of a game entity from which the view is taken, the location the view depicts, and/or other locations), a zoom ratio, a dimensionality of objects, a point-of-view of a game entity, and/or view parameters.

The instance of the virtual space may comprise a simulated space that is accessible by one or more users via computing platforms that present the views of the virtual space to one or more users. The simulated space may include virtual space content. The simulated space may express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The instance executed by machine-readable instructions 106 may be synchronous, asynchronous, and/or semi-synchronous.

The above description of the manner in which views of a virtual space and/or video game taking place in the virtual space are determined by space component 108 is not intended to be limiting. The space component 108 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 108, users may control game entities, objects, simulated physical phenomena (e.g., wind, rain, earthquakes, and/or other phenomena), and/or other elements within the virtual space to interact with the virtual space and/or each other. One or more user controlled element(s) may move through and interact with the virtual space (e.g., non-user characters in the virtual space, and/or other virtual space content in the virtual space). The user controlled elements controlled by and/or associated with a given user may be created and/or customized by the given user. The user may have an "inventory" of virtual items and/or currency that the user can use (e.g., by manipulation of a game entity or other user controlled element, and/or other items) within the virtual space.

Virtual objects may include game objects. Game objects may include virtual items and/or goods. Virtual items and/or goods may include one or more of a virtual weapon, a tool, a food, a currency, a reward, a bonus, health, a potion, an enhancement, a mount, a power-up, a speed-up, clothing, a vehicle, an anatomical feature of a game entity, a troop or troop type, a pet, a virtual resource, and/or other virtual items and/or goods.

The users may interact with each other through communications exchanged within the virtual space. Such communications may include one or more of textual chat, instant messages, private messages, voice communications, and/or other communications. Communications may be received and entered by the users via their respective computing platforms. Communications may be routed to and/or from the appropriate users through server 102.

User participation in the virtual space may include controlling game entities in the virtual space. Control may be exercised through control inputs and/or commands input by the users through computing platform(s) 120. A game entity may refer to a virtual object (or group of objects) present in the virtual space that represents an individual user. For example, a game entity may be a virtual character (e.g., an avatar) and/or other virtual objects. A group of game entities may include a group of virtual characters, virtual objects, and/or other content.

In some implementations, timing component 109 may be configured to determine time points along a timeline of state information, and/or perform other operations. The time points may be associated within individual frame images of a video to be generated and/or frame images for real-time, or near real-time, streaming of views of the virtual space in accordance with user gameplay. In some implementations, time points may be determined based on a timing specification, and/or other information. A timing specification may include one or more of frame range, time range, frame rate, and/or other timing specification that may facilitate determining time points along a timeline. In some implementations, a timing specification may be determined based on one or more of user input, a playback capability of a computing platform presenting views of the virtual space, and/or other information. By way of non-limiting illustration, timing component 109 may be configured to determine, for a first video, one or more of a first time point associated with a first frame image, a second time point associated with a second frame image, a third time point associated with a third frame image, and/or other information.

In some implementations, prediction component 110 may be configured to assign predictive models to individual pixels of frame images. Individual predictive models may be configured to predict individual pixel colors of individual pixels at individual time points associated with the time points. In some implementations, individual predictive models may be linear models, non-linear models, and/or other types of model. By predicting pixel colors, computational efforts of geometry processing and/or shading stages to determined pixel colors from state information may be reduced and/or otherwise eliminated. In some implementations, prediction component 110 may be configured to replace a predictive model assigned to an individual pixel with another predictive model. In some implementations, different model instances of the same predictive model may be assigned to more than one pixel. Predictive model updates may be performed (see, e.g., update component 114).

Individual models may comprise one or more model coefficients, model variables, and/or other components. By way of non-limiting illustration, a linear predictive model, $Y_i$, may be expressed as follows:

$$Y_i = \beta_i^T \begin{bmatrix} 1 \\ X_i \end{bmatrix},$$

where $\beta_i$ may denote the linear model coefficients, and $X_i$ may denote model variables. In some implementations, given that individual colors may be defined by values of one or more color components (e.g., color channels), such as three color components for an RGB color space, $\beta_i$ may include three (or other amount) times the coefficients. This may be represented as $\beta_i^{r,g,b}$ where individual color components (e.g., color channels) may include a different coefficient(s).

By way of non-limiting illustration, for the first video comprising one or more of the first frame image, the second frame image, the third frame image, and/or other frame images, prediction component 110 may be configured to assign one or more of a first model instance of a first predictive model to a first pixel, a second model instance of a second predictive model to a second pixel, and/or other model instances to other pixels. In some implementations, different model instances of different predictive models may include the same, similar, or different model coefficients. In some implementations, instances of predictive models may be initialized using one or more predetermined coefficients.

In some implementations, prediction component 110 may be configured to predict, at individual time points (e.g., for individual frames associated with the individual time points), individual pixel colors of individual pixels using assigned predictive models, and/or other information. By way of non-limiting illustration, for the first time point, prediction component 110 may be configured to predict one or more of a first color for the first pixel in the first frame image based on the first model instance of the first predictive model, a second color for the second pixel in the first frame image based on the second model instance of the second predictive model, and/or other colors for other pixels based on other predictive models. For the second point in time and/or other points in time, prediction of pixel colors may depend on inform derived at one or more preceding time points.

In some implementations, frame image component 112 may be configured to determine presented pixel colors for individual pixels of individual frames. In some implementations, presented pixel colors may be determined based on one or more of predicted pixel colors, input pixel information, color blending, and/or other information and/or techniques.

In some implementations, for individual time points (e.g., for individual frames associated with the individual time points), frame image component 112 may be configured to obtain input pixel information (e.g., from electronic storage 118 and/or other location). By way of non-limiting illustration, for the first time point, frame image component 112 may be configured to obtain input pixel information that may specify one or more of a third color for the first pixel in the first frame image, a fourth color for the second pixel in the first frame image, and/or other information.

In some implementations, for individual pixels in the individual frame images associated with individual time points, frame image component 112 may be configured to determine differences between individual predicted pixel colors of individual pixels and individual specified pixel colors of the individual pixels included in the input pixel information.

In some implementations, differences may be determined based on comparing Euclidean distances between pixel colors when plotted in an RGB color space and/or other color space. By way of non-limiting example, a shorter distance may reflect more similarity between colors than a relatively longer distances. In some implementations, a similarity or dissimilarity may be determined based on one or more threshold distances. In some implementations, differences may be determined based on a CIEDE2000 color difference formula, and/or other techniques.

In some implementations, for individual pixels in individual frame images associated with individual time points, frame image component 112 may be configured to determine differences between individual predicted pixel colors of one or more neighboring pixels of the individual pixels and individual specified pixel colors of the individual pixels included in the input pixel information. In some implementations, a neighborhood may be defined an m×n grid and/or an m×m grid of pixels surrounding a given pixel. By way of non-limiting illustration, a grid may be one or more of a 3 by 3 grid, a 5 by 5 pixel grid, and/or other size grids. In some implementations, a search for pixels within the neighborhood having the lowest error may be a nested search.

In some implementations, based on determined differences, frame image component 112 may be configured to perform one or more of assigning predicted colors as individual pixel colors of individual pixels, assigning predicted colors of individual neighboring pixels as individual pixel color of individual pixels, maintaining assignments of predictive models, reprojecting predictive models, and/or other operations.

In some implementations, for individual pixels of individual frame images associated with individual time points, responsive to a difference between an individual predicted pixel color of an individual neighboring pixel and an individual specified pixel color of an individual pixel included in the input pixel information being less than a difference between an individual predicted pixel color of the individual pixel and the individual specified pixel color of the individual pixel included in input pixel information, the individual pixel color of the individual pixel may be assigned the predicted pixel color of the individual neighboring pixel. By way of non-limiting example, if a neighboring pixel of a given pixel has a pixel color that better represents the specified pixel color included in the pixel information (based on having a smaller difference), the given pixel may be assigned the pixel color of the neighboring pixel. Alternatively, if a predicted color of a given pixel better represents the specified color of the given pixel than predicted colors of one or more neighboring pixels, than the given pixel may be assigned its predicted pixel color.

By way of non-limiting illustration, for the first pixel at the first time point, one or more of a first difference, a second difference, and/or other differences may be determined. The first difference may be between the first color (e.g., predicted color of first pixel) and the third color (e.g., specified color of first pixel). The second difference may be between the second color (e.g., predicted color for the second pixel, given that the second pixel is within a specified neighborhood of the first pixel) and the third color (e.g., specified color of first pixel). Other differences between predicted colors of other neighboring pixels (of the first pixel) and the third color may be determined. In some implementations, responsive to the second difference being less than the first difference and/or other differences between other predicted colors of neighboring pixels and the third color, the pixel color of the first pixel in the first frame image may be assigned to the second color. However, if a color difference between a color of another neighboring pixel and the specified color of the first pixel may be less than the second difference, the pixel color of the first pixel may be assigned to the color of the other neighboring pixel.

By way of non-limiting illustration, for the second pixel at the first time point, one or more of a third difference, forth difference, and/or other differences may be determined. The third difference may be between the second color (e.g., predicted color of the second pixel) and the fourth color (e.g., specified color of the second pixel). The fourth difference may be between the first color (e.g., predicted color of the first pixel, given that the first pixel is within a specified neighborhood of the second pixel) and the fourth color (e.g., specified color of the second pixel). Other differences between predicted colors of other neighboring pixels (of the second pixel) and the fourth color may be determined. In some implementations, responsive to the third difference being less than the fourth difference and/or other differences between other predicted colors of other neighboring pixels and the fourth color, the pixel color of the second pixel in the first frame image may be assigned to the second color (e.g., it's predicted color).

In some implementations, based on individual pixel colors of individual pixels being assigned to individual colors of individual neighboring pixels, prediction component 110 may be configured to reassign those individual pixels to other instances of individual predictive models assigned to the individual neighboring pixels. In some implementations, when another instance of a predictive model assigned to a neighboring pixel has been reprojected to another pixel, the other instance of the predictive model may include the same or similar coefficients as the instance of the predictive model assigned to the neighboring pixel, and/or may include other information.

By way of non-limiting illustration, based on the pixel color of the first pixel in the first frame image being assigned to the second color (e.g., predicted pixel color of the second pixel), a third model instance of the second predictive model may be reprojected to the first pixel (e.g., assigned to the first pixel). The third model instance of the second predictive model may include the same or similar model coefficients as the second instance of the second predictive model assigned to the second pixel. By way of non-limiting illustration, based on the pixel color of the second pixel being assigned its predicted color for the first frame image, the assignment of the second instance of the second predictive model to the second pixel may be maintained.

The above descriptions illustrates an exemplary iteration of determining differences between predicted pixel colors and specified pixels colors, assigning pixel colors based on the differences, and reassigning predictive models for a first pixel and a second pixel at the first time point associated with the first frame image. However, it is noted that similar operations may be carried out for one or more remaining pixels of the first image frame image until more pixels (for example, all pixels and/or a majority of pixels) may be assigned a pixel color and/or a predictive model (via maintained prior assignment or reassignment).

In some implementations, before continuing on to further time points associated with further frame images, frame image component 112 may be configured to determined presented pixel colors of individual pixels based on the assigned pixel colors. By way of non-limiting illustration, for individual frame images at individual time points, given assigned pixel colors of individual pixels of the individual frame images, frame image component 112 may be configured to determine presented pixel colors and/or other information. The presented pixel colors may refer to pixel colors that may be included in the presented frame images of a video displayed via a computing platform. In some implementations, determining presented pixel colors may comprise performing one or more of color blending, and/or other techniques. In some implementations, color blending may comprise a weighted blending of a pixel color of a given pixel with one or more pixel colors of one or more neighboring pixels. In some implementations, a weighted blending may be accomplished via a bilateral filter, and/or other techniques.

By way of non-limiting illustration, presented pixel colors of one or more of the first pixel, second pixel and/or other pixels may be determined by color blending the assigned second color of the first pixel, the assigned second color of the second pixel, and/or other assigned pixel colors of other neighboring pixels.

In FIG. 1, update component 114 may be configured to, for individual time points, update individual predictive models assigned (and/or reassigned and/or reprojected) to individual pixels based on individual differences between individual assigned pixel colors (which are either predicted pixel colors of the individual pixels or predicted pixel colors of a neighboring pixel) and individual specified pixel colors. In some implementations, updating predictive models may comprise updating model coefficients. By way of non-limiting illustration, model coefficients may be updated using one or more of a least squares fitting technique, recursive least squares (RLS) fitting technique, and/or other techniques.

By way of non-limiting illustration, for third model instance of the second predictive model reprojected to the first pixel at the first time point, update component 114 may be configured to update the third model instance of the second predictive model based on the second difference (again, being the difference between the predicted color for the second pixel and the specified color of first pixel). By way of non-limiting illustration, for the second pixel assigned to the second model instance of the second predictive model, update component 114 may be configured to update the second model instance of the second predictive model based on the third difference (again, being the difference between the predicted color of the second pixel and the specified color of the second pixel).

The following illustrates another iteration of features and/or functions of one or more of prediction component 110, frame image component 112, and/or update component 114 that may be performed during a second time point, following the first time point, given the color and/or predictive model assignments for the first pixel, second pixel, and/or other pixels determined for the first time point. It is noted that similar operations may be performed via iterations over one or more other time points using information derived from one or more preceding time points.

By way of non-limiting illustration, for the second time point associated with the second frame image, prediction component 110 may be configured to perform one or more of predicting a fifth color for the first pixel in the second frame image based on the updated third model instance of the second predictive model, predicting a sixth color for the second pixel in the second frame image based on the updated second model instance of the second predictive model predicts, and/or predicting other pixels colors for other pixels of the second frame image.

In some implementations, frame image component 112 may be configured to obtain input pixel information that may specify one or more of a seventh color for the first pixel in the second frame image, an eighth color for the second pixel in the second frame image, and/or other colors of other pixels in the second frame image.

In some implementations, frame image component 112 may be configured to, for the first pixel in the second frame image, determine one or more of a fifth difference between the fifth color and the seventh color, a sixth difference between the sixth color and the seventh color, and/or other differences between other predicted colors of other neighboring pixels of the first pixel and the seventh color. Responsive to determining the fifth difference may be less than the sixth difference, frame image component 112 may be configured to assign the pixel color of the first pixel in the second frame image to the fifth color. Responsive to the pixel color of the first pixel in the second frame image being assigned the fifth color, prediction component 110 may be configured to maintain the assignment of the first pixel to the updated third model instance of the second predictive model.

In some implementations, the frame image component 112 may be configured to, for the second pixel in the second frame image, determine one or more of a seventh difference between the sixth color and the eighth color, an eighth difference between the seventh color and the eighth color, and/or other differences between other predicted colors of other neighboring pixels of the second pixel and the eighth color. Responsive to determining that the eighth difference may be less than the seventh difference, frame image component 112 may be configured such that the pixel color of the second pixel in the second frame image may be assigned to the seventh color. Responsive to the pixel color of the second pixel in the second frame image being assigned the seventh color, prediction component 110 may be configured to reassign the second pixel to a fourth model instance of the second predictive model. The fourth model instance of the second predictive model may include the same or similar model coefficients as the updated third model instance of the second predictive model and/or may include other information. The update component 114 may be configured to, for the first pixel in the second frame image, update the updated third model instance of the second predictive model based on the fifth difference. The update component 114 may be configured to, for the second pixel in the second frame image, update the fourth model instance of the third predictive model based on the eighth difference.

Figure 2:
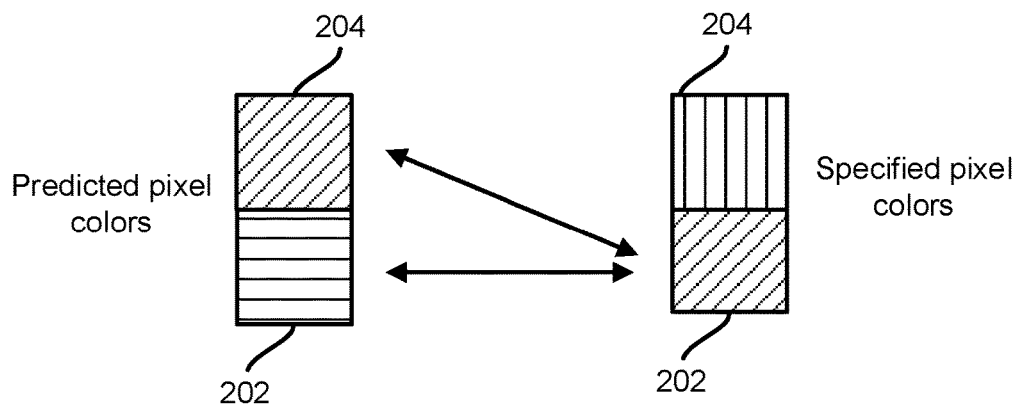
FIG. 2 illustrates a graphical representation of one or more features and/or functions of the system, in accordance with one or more implementations.
Figure 3:
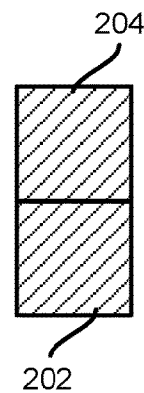
FIG. 3 illustrates a graphical representation of one or more features and/or functions of the system, in accordance with one or more implementations.

FIG. 2 and FIG. 3 illustrate graphical representation of one or more features and/or functions of one or more implementations of system 100, described herein. FIG. 2, the left hand side shows a first pixel 202 at a first time point having a predicted pixel color (shown by horizontal lines) determined in accordance with one or more techniques presented herein, and a second pixel 204 at the first time point having a predicted pixel color (shown as diagonal lines) determined in accordance with one or more techniques presented herein. The right hand side of FIG. 2 shows the first pixel 202 at the first time point having a specified pixel color (shown by diagonal lines) determined in accordance with one or more techniques presented herein, and the second pixel 204 at the first time point having a specified pixel color (shown as vertical lines) determined in accordance with one or more techniques presented herein.

For illustrative purposes, consider only one or more features and/or functions that may be carried out to assigned a pixel color of the first pixel 202 at the first time point and also consider a neighborhood surrounding the first pixel 202 that includes at least the second pixel 204. For the first time point, a first difference between the predicted color of the first pixel 202 (left hand side) and the specified color of the first pixel 202 (right hand side) may be determined. For the first time point, a second difference between the predicted color of the second pixel 204 (left hand side) and the specified color of the first pixel 202 (right hand side may be determined). Responsive to the second difference being less than the first difference, the pixel color of the first pixel 202 may be assigned the predicted color the second pixel 204 (diagonal lines), as illustrated in FIG. 3. Further, another instance of a predictive model that may be assigned to the second pixel 204 may be reprojected to the first pixel 202. It is noted that the illustrations in FIGS. 2 and 3 do not reflect one or more processes that may be carried out with respect to assigning a pixel color to the second pixel 204 based on the predicted and specified colors of the second pixel, however such processes may be the same or similar as described above.

In FIG. 1, the server 102, computing platform(s) 120, and/or external resources 122 may be operatively linked via one or more electronic communication links. For example, such electronic communication links may be established, at least in part, via network(s) 124 such as the Internet and/or other networks. It will be appreciated that this is not intended to be limiting and that the scope of this disclosure includes implementations in which server 102, computing platforms 120, external resources 122, and/or other entities may be operatively linked via some other communication media.

The external resources 122 may include sources of information, hosts, external entities participating with system 100, and/or other resources. In some implementations, some or all of the functionality attributed herein to external resources 122 may be provided by resources included in system 100.

The server 102 may include electronic storage 118, one or more processors 104, and/or other components. The server 102 may include communication lines or ports to enable the exchange of information with a network and/or other computing platforms. Illustration of server 102 in FIG. 1 is not intended to be limiting. The server 102 may include a plurality of hardware, software, and/or firmware components operating together to provide the functionality attributed herein to server 102. For example, server 102 may be implemented by a cloud of computing platforms operating together as server 102.

Electronic storage 118 may comprise electronic storage media that electronically stores information. The electronic storage media of electronic storage 118 may include one or both of system storage that is provided integrally (i.e., substantially non-removable) with server 102 and/or removable storage that is removably connectable to server 102 via, for example, a port or a drive. A port may include a USB port, a firewire port, and/or other port. A drive may include a disk drive and/or other drive. Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 118 may include one or more virtual storage resources (e.g., cloud storage, a virtual private network, and/or other virtual storage resources). The electronic storage 118 may store software algorithms, information determined by processor(s) 104, information received from computing platform(s) 120, and/or other information that enables server 102 to function as described herein.

Processor(s) 104 may be configured to provide information-processing capabilities in server 102. As such, processor(s) 104 may include one or more of a digital processor, an analog processor, a digital circuit designed to process information, an analog circuit designed to process information, a state machine, and/or other mechanisms for electronically processing information. Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 109, 110, 112, and/or 114. Processor(s) 104 may be configured to execute components 108, 109, 110, 112, and/or 114 by software; hardware; firmware; some combination of software, hardware, and/or firmware; and/or other mechanisms for configuring processing capabilities on processor(s) 104.

It should be appreciated that although components 108, 109, 110, 112, and/or 114 are illustrated in FIG. 1 as being co-located within a single processing unit, in implementations in which processor(s) 104 includes multiple processing units, one or more of components 108, 109, 110, 112, and/or 114 may be located remotely from the other components. The description of the functionality provided by the different components 108, 109, 110, 112, and/or 114 described above is for illustrative purposes and is not intended to be limiting, as any of components 108, 109, 110, 112, and/or 114 may provide more or less functionality than is described. For example, one or more of components 108, 109, 110, 112, and/or 114 may be eliminated, and some or all of its functionality may be provided by other ones of components 108, 109, 110, 112, 114, and/or other components. As another example, processor(s) 104 may be configured to execute one or more additional components that may perform some or all of the functionality attributed below to one of components 108, 109, 110, 112, and/or 114.

Figure 4:
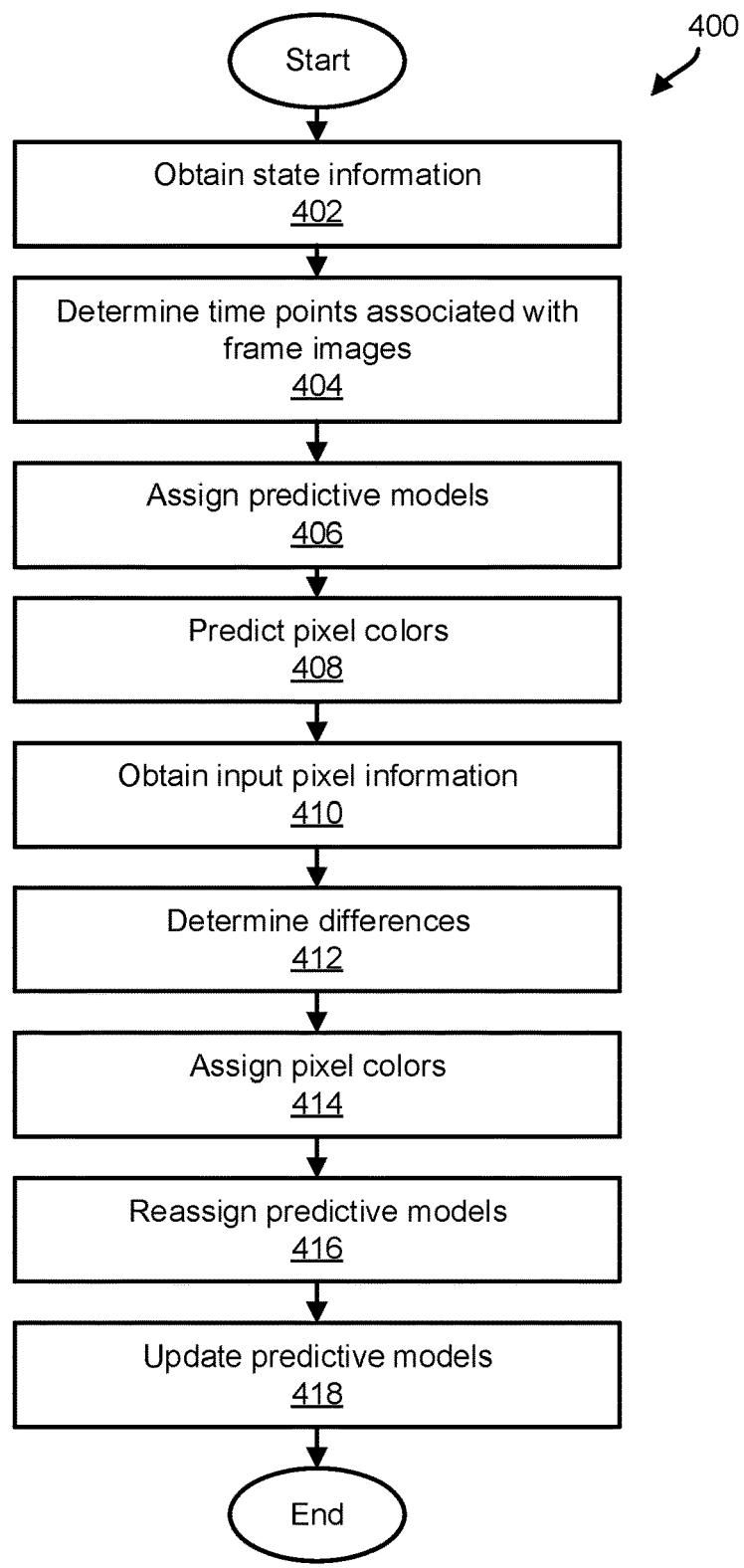
FIG. 4 illustrates a method of presenting views of a virtual space, in accordance with one or more implementations.

FIG. 4 illustrates a method 400 of presenting views of a virtual space, in accordance with one or more implementations. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in a computer system comprising one or more processing devices (e.g., physical processor, a digital processor, an analog processor, a digital circuit designed to process information, an analog circuit designed to process information, a state machine, and/or other mechanisms for electronically processing information), electronic storage media storing machine-readable instructions, and/or other components. The one or more processing devices may include one or more devices executing some or all of the operations of method 400 in response to instructions stored electronically on electronic storage media. The one or more processing devices may include one or more devices configured through hardware, firmware, and/or software to be specifically designed for execution of one or more of the operations of method 400.

At an operation 402, state information defining state of a virtual space may be obtained. The virtual space may include one or more of topography, one or more virtual objects, and/or other virtual space content. State of the virtual space at individual time points may define one or more of the topography, one or more virtual objects, positions of virtual objects, and/or other information. In some implementations, operation 402 may be performed by one or more physical processors executing a space component the same as or similar to space component 108 (shown in FIG. 1 and described herein).

At an operation 404, time points associated within individual frame images of a video of the virtual space may be obtained. Individual frame images may comprise multiple pixels. Individual pixels may have pixel colors and/or pixel locations. Individual frame images may depict individual views of the virtual space at individual ones of the associated time points. By way of non-limiting illustration, the time points may include one or more of a first time point associated with a first frame image, a second time point associated with a second frame image, and/or other time points. In some implementations, operation 404 may be performed by one or more physical processors executing a timing component the same as or similar to timing component 109 (shown in FIG. 1 and described herein).

At an operation 406, predictive models may be assigned to individual pixels. Individual predictive models may be configured to predict individual pixel colors of individual pixels at individual time points. By way of non-limiting illustration, a first pixel may be assigned a first model instance of a first predictive model, a second pixel may be assigned a second model instance of a second predictive model, and/or other pixels may be assigned other predictive models. In some implementations, operation 406 may be performed by one or more physical processors executing a prediction component the same as or similar to prediction component 110 (shown in FIG. 1 and described herein).

At an operation 408, for individual time points, individual pixel colors of the individual pixels may be predicted using assigned individual predictive models. By way of non-limiting illustration, for the first time point the first model instance of the first predictive model may predict a first color for the first pixel in the first frame image, the second model instance of the second predictive model may predict a second color for the second pixel in the first frame image, and/or other pixel colors may be predicted. In some implementations, operation 408 may be performed by one or more physical processors executing a prediction component the same as or similar to prediction component 110 (shown in FIG. 1 and described herein).

At an operation 410, for individual time points, input pixel information may be obtained. The input pixel information may specify colors of individual pixels of individual frame images that depict a view of the virtual space at the individual time points. By way of non-limiting illustration, for the first time point the input pixel information may specify one or more of a third color for the first pixel in the first frame image, a fourth color for the second pixel in the first frame image, and/or other colors for other pixels. In some implementations, operation 410 may be performed by one or more physical processors executing a frame image component the same as or similar to frame image component 112 (shown in FIG. 1 and described herein).

At an operation 412, one or more of differences between individual predicted pixel colors of the individual pixels and the individual specified pixel colors of the individual pixels included in the input pixel information may be determined, and/or differences between individual predicted pixel colors of neighboring pixels and the individual specified pixel colors of the individual pixels included in the input pixel information may be determined. By way of non-limiting illustration, for the first pixel in the first frame image, one or more of a first difference between the first color and the third color may be determined, a second difference between the second color and the third color may be determined, and/or other differences may be determined. By way of non-limiting illustration, for the second pixel in the first frame image, one or more of a third difference between the second color and the fourth color may be determined, a fourth difference between the first color and the fourth color may be determined, and/or other differences may be determined. In some implementations, operation 412 may be performed by one or more physical processors executing a frame image component the same as or similar to frame image component 112 (shown in FIG. 1 and described herein).

At an operation 414, responsive to the differences between individual predicted pixel colors of neighboring pixels and the individual specified pixel colors of the individual pixels included in the input pixel information being less than the differences between individual predicted pixel colors of the individual pixels and the individual specified pixel colors of the individual pixels included in the input pixel information, the individual pixel colors of the individual pixels in the individual frame images may be assigned as the individual predicted pixel colors of the individual neighboring pixels. By way of non-limiting illustration, for the first pixel in the first frame image, responsive to determining that the second difference is less than the first difference, the pixel color of the first pixel in the first frame image may be assigned to the second color. By way of non-limiting illustration, for the second pixel in the first frame image, responsive to determining that the third difference is less than the fourth difference, the pixel color of the second pixel in the first frame image may be assigned to the second color. In some implementations, operation 414 may be performed by one or more physical processors executing a frame image component the same as or similar to frame image component 112 (shown in FIG. 1 and described herein).

At an operation 416, responsive to individual pixels being assigned a pixel color of an individual neighboring pixel, other instances of individual predictive models assigned to the individual neighboring pixels may be reprojected to the individual pixels. By way of non-limiting illustration, responsive to the first pixel being assigned the second color, a third instance of the second predictive model may be reprojected to the first pixel, By way of non-limiting illustration, responsive to the second pixel being assigned the second color, the second pixel's assignment to the second instance of the second predictive model may be maintained. In some implementations, operation 416 may be performed by one or more physical processors executing a prediction component the same as or similar to prediction component 110 (shown in FIG. 1 and described herein).

At an operation 418, for individual pixels at individual time points, individual predictive models assigned to the individual pixels may be updated based on the individual differences between individual assigned pixel colors and the individual specified pixel colors. By way of non-limiting illustration, for the first pixel, the third model instance of the second predictive model may be updated based on the second difference. By way of non-limiting illustration, for the second pixel, the second model instance of the second predictive model may be updated based on the third difference. In some implementations, operation 418 may be performed by one or more physical processors executing an update component the same as or similar to update component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured for presenting views of a virtual space, the system comprising:
   one or more physical processors configured by machine-readable instructions to:
      obtain state information defining state of a virtual space, the virtual space including topography and virtual objects, such that the state of the virtual space at individual time points defines the topography, the virtual objects, and positions of virtual objects;
      determine time points associated within individual frame images of a video of the virtual space, individual frame images comprising individual pixels having pixel colors and pixel locations, individual frame images depicting individual views of the virtual space at individual ones of the associated time points, the time points including a first time point associated with a first frame image and a second time point associated with a second frame image;
      assign predictive models to individual pixels, individual predictive models being configured to predict individual pixel colors of individual pixels at individual time points, a first pixel being assigned a first model instance of a first predictive model and a second pixel being assigned a second model instance of a second predictive model; and
      for individual time points:
         predict, using assigned individual predictive models, individual pixel colors of the individual pixels, such that for the first time point the first model instance of the first predictive model predicts a first color for the first pixel in the first frame image and the second model instance of the second predictive model predicts a second color for the second pixel in the first frame image;
         obtain input pixel information, the input pixel information being determined from state information, the input pixel information specifying colors of individual pixels of individual frame images that depict a view of the virtual space at the individual time points, such that for the first time point the input pixel information specifies a third color for the first pixel in the first frame image and a fourth color for the second pixel in the first frame image; and
         for individual pixels in the individual frame images:
            determine differences between individual predicted pixel colors of the individual pixels and the individual specified pixel colors of the individual pixels included in the input pixel information, and differences between individual predicted pixel colors of neighboring pixels and the individual specified pixel colors of the individual pixels included in the input pixel information;

responsive to the differences between individual predicted pixel colors of neighboring pixels and the individual specified pixel colors of the individual pixels included in the input pixel information being less than the differences between individual predicted pixel colors of the individual pixels and the individual specified pixel colors of the individual pixels included in the input pixel information, assign the individual pixel colors of the individual pixels in the individual frame images as the individual predicted pixel colors of the individual neighboring pixels, and reassign the individual pixels to other instances of individual predictive models assigned to the individual neighboring pixels, such that:

for the first pixel at the first time point, based determining a first difference between the first color and the third color, and a second difference between the second color and the third color, and responsive to determining that the second difference is less than the first difference, the pixel color of the first pixel in the first frame image is assigned to the second color and the first pixel is reassigned to a third model instance of the second predictive model, and for the second pixel at the first time point, based determining a third difference between the second color and the fourth color, and a fourth difference between the first color and the fourth color, and responsive to determining that the third difference is less than the fourth difference, the pixel color of the second pixel in the first frame image is assigned to the second color and the assignment of the second model instance of the second predictive model to the second pixel is maintained; and update the individual predictive models assigned to the individual pixels based on the individual differences between individual assigned pixel colors and the individual specified pixel colors, such that:

for the first pixel, the third model instance of the second predictive model is updated based on the second difference, and for the second pixel, the second model instance of the second predictive model is updated based on the third difference.

2. The system of claim 1, wherein the one or more physical processors are further configured by machine-readable instructions such that:

for the second time point:
the updated third model instance of the second predictive model predicts a fifth color for the first pixel in the second frame image, and the updated second model instance of the second predictive model predicts a sixth color for the second pixel in the second frame image;

the input pixel information specifies an seventh color for the first pixel in the second frame image, and an eighth color for the second pixel in the second frame image;

for the first pixel in the second frame image, based on determining a fifth difference between the fifth color and the seventh color, and a sixth difference between the sixth color and the seventh color, and responsive to determining that the fifth difference is less than the sixth difference, the pixel color of the first pixel in the second frame image is assigned to the fifth color and the assignment of the first pixel to the updated third model instance of the second predictive model is maintained, and for the second pixel in the second frame image, based determining a seventh difference between the sixth color and the eighth color, and an eighth difference between the seventh color and the eighth color, and responsive to determining that the eighth difference is less than the seventh difference, the pixel color of the second pixel in the second frame image is assigned to the seventh color, and the second pixel is reassigned to a fourth model instance of the second predictive model;

for the first pixel, the updated third model instance of the second predictive model is updated based on the fifth difference, and for the second pixel, the fourth model instance of the third predictive model is updated based on the eighth difference.

3. The system of claim 1, wherein the one or more physical processors are further configured by machine-readable instructions to:

for individual pixels of individual frame images at individual time points, determine presented pixel colors by blending pixels colors of neighboring pixels.

4. The system of claim 3, wherein the blending in accomplished by a bilateral filter.

5. The system of claim 1, wherein individual predictive models are linear models.

6. The system of claim 1, wherein the input pixel information is a raster input signal.

7. The system of claim 1, wherein differences may be determined based on comparing Euclidean distances between pixel colors in an RGB color space.

8. The system of claim 1, wherein neighboring pixels are determined within at least a 3×3 pixel grid.

9. The system of claim 1, wherein the determined differences between individual predicted pixel colors of the individual pixels and the individual specified pixel colors of the individual pixels included in the input pixel information are estimates of predicted pixel color error.

10. The system of claim 1, wherein individual models include different coefficients for different color components of individual colors.

11. A method of presenting views of a virtual space, the method being implemented in a computer system comprising one or more physical processor and non-transitory electronic storage storing machine-readable instructions, the method comprising:

obtaining state information defining state of a virtual space, the virtual space including topography and virtual objects, such that the state of the virtual space at individual time points defines the topography, the virtual objects, and positions of virtual objects;

determining time points associated within individual frame images of a video of the virtual space, individual frame images comprising individual pixels having pixel colors and pixel locations, individual frame images depicting individual views of the virtual space at individual ones of the associated time points, the time points including a first time point associated with a first frame image and a second time point associated with a second frame image;

assigning predictive models to individual pixels, individual predictive models being configured to predict individual pixel colors of individual pixels at individual time points, including a first pixel being assigned a first model instance of a first predictive model and a second pixel being assigned a second model instance of a second predictive model; and for individual time points:
  predicting, using assigned individual predictive models, individual pixel colors of the individual pixels, including for the first time point using the first model instance of the first predictive model to predict a first color for the first pixel in the first frame image and the second model instance of the second predictive model to predict a second color for the second pixel in the first frame image;
  obtaining input pixel information, the input pixel information being determined from state information, the input pixel information specifying colors of individual pixels of individual frame images that depict a view of the virtual space at the individual time points, including obtaining, for the first time point input pixel information that specifies a third color for the first pixel in the first frame image and a fourth color for the second pixel in the first frame image; and
  for individual pixels in the individual frame images:
    determining differences between individual predicted pixel colors of the individual pixels and the individual specified pixel colors of the individual pixels included in the input pixel information, and differences between individual predicted pixel colors of neighboring pixels and the individual specified pixel colors of the individual pixels included in the input pixel information;
    responsive to the differences between individual predicted pixel colors of neighboring pixels and the individual specified pixel colors of the individual pixels included in the input pixel information being less than the differences between individual predicted pixel colors of the individual pixels and the individual specified pixel colors of the individual pixels included in the input pixel information, assigning the individual pixel colors of the individual pixels in the individual frame images as the individual predicted pixel colors of the individual neighboring pixels, and reassigning the individual pixels to other instances of individual predictive models assigned to the individual neighboring pixels, such that:
      for the first pixel at the first time point, based determining a first difference between the first color and the third color, and a second difference between the second color and the third color, and responsive to determining that the second difference is less than the first difference, the pixel color of the first pixel in the first frame image is assigned to the second color and the first pixel is reassigned to a third model instance of the second predictive model, and
      for the second pixel at the first time point, based determining a third difference between the second color and the fourth color, and a fourth difference between the first color and the fourth color, and responsive to determining that the third difference is less than the fourth difference, the pixel color of the second pixel in the first frame image is assigned to the second color and the assignment of the second model instance of the second predictive model to the second pixel is maintained; and
    updating the individual predictive models assigned to the individual pixels based on the individual differences between individual assigned pixel colors and the individual specified pixel colors, such that:
      for the first pixel, updating the third model instance of the second predictive model based on the second difference, and
      for the second pixel, updating the second model instance of the second predictive model based on the third difference.

12. The method of claim 11, wherein the one or more physical processors are further configured by machine-readable instructions such that:
  for the second time point:
    the updated third model instance of the second predictive model predicts a fifth color for the first pixel in the second frame image, and the updated second model instance of the second predictive model predicts a sixth color for the second pixel in the second frame image;
    the input pixel information specifies an seventh color for the first pixel in the second frame image, and an eighth color for the second pixel in the second frame image;
    for the first pixel in the second frame image, based on determining a fifth difference between the fifth color and the seventh color, and a sixth difference between the sixth color and the seventh color, and responsive to determining that the fifth difference is less than the sixth difference, the pixel color of the first pixel in the second frame image is assigned to the fifth color and the assignment of the first pixel to the updated third model instance of the second predictive model is maintained, and
    for the second pixel in the second frame image, based determining a seventh difference between the sixth color and the eighth color, and an eighth difference between the seventh color and the eighth color, and responsive to determining that the eighth difference is less than the seventh difference, the pixel color of the second pixel in the second frame image is assigned to the seventh color, and the second pixel is reassigned to a fourth model instance of the second predictive model;
    for the first pixel, the updated third model instance of the second predictive model is updated based on the fifth difference, and
    for the second pixel, the fourth model instance of the third predictive model is updated based on the eighth difference.

13. The method of claim 11, wherein the one or more physical processors are further configured by machine-readable instructions to:
  for individual pixels of individual frame images at individual time points, determine presented pixel colors by blending pixels colors of neighboring pixels.

14. The method of claim 13, wherein the blending in accomplished by a bilateral filter.

15. The method of claim 11, wherein individual predictive models are linear models.

16. The method of claim 11, wherein the input pixel information is a raster input signal.

17. The method of claim 11, wherein differences may be determined based on comparing Euclidean distances between pixel colors in an RGB color space.

18. The method of claim 11, wherein neighboring pixels are determined within at least a 3×3 pixel grid.

19. The method claim 11, wherein the determined differences between individual predicted pixel colors of the individual pixels and the individual specified pixel colors of the individual pixels included in the input pixel information are estimates of predicted pixel color error.

20. The method of claim 11, wherein individual models include different coefficients for different color components of individual colors.

\* \* \* \* \*